United States Patent [19]

Obuchi

[11] Patent Number: 5,371,674
[45] Date of Patent: Dec. 6, 1994

[54] LANGUAGE PROCESSING APPARATUS FOR CARRYING OUT TRANSLATION PROCESS BASED ON SENTENCE PATTERN INFORMATION

[75] Inventor: Yasuji Obuchi, Kitakatsuragi, Japan

[73] Assignee: Sharp Kabushiki Kaisha, Osaka, Japan

[21] Appl. No.: 964,911

[22] Filed: Oct. 22, 1992

[30] Foreign Application Priority Data

Oct. 30, 1991 [JP] Japan ................... 3-285040

[51] Int. Cl.⁵ .................. G06F 15/38; G06G 7/60
[52] U.S. Cl. .................. 364/419.05; 364/419.02; 364/419.07
[58] Field of Search ........... 364/419, 419.02, 419.05, 364/419.07; 434/156

[56] References Cited

U.S. PATENT DOCUMENTS

| | | | |
|---|---|---|---|
| 4,502,128 | 2/1985 | Okajima et al. | 364/419.08 |
| 4,608,665 | 8/1986 | Yoshida | 364/419.02 |
| 4,654,798 | 3/1987 | Taki et al. | 364/419.07 |
| 4,774,666 | 9/1988 | Miyao et al. | 364/419.02 |
| 4,805,132 | 2/1989 | Okamoto et al. | 364/419.03 |
| 4,833,611 | 5/1989 | Fukumochi et al. | 364/419.05 |
| 4,954,984 | 9/1990 | Kaijima et al. | 364/419.05 |
| 5,020,021 | 5/1991 | Kaji et al. | 364/419.05 |

*Primary Examiner*—Gail O. Hayes
*Assistant Examiner*—Stephen R. Tkacs
*Attorney, Agent, or Firm*—Nixon & Vanderhye

[57] ABSTRACT

When a term of a portion of a sentence in a first language to be translated is entered, a term in a second language corresponding to the term is displayed, and information of a sentence pattern and the like for constructing a sentence based on the entered term is displayed in the first language. When a term appropriate to the portion of the displayed information is entered in the first language, a portion of the information is converted into the second language satisfying grammatical restriction to be displayed. A similar process is carried out for the remaining portions of the information.

8 Claims, 6 Drawing Sheets

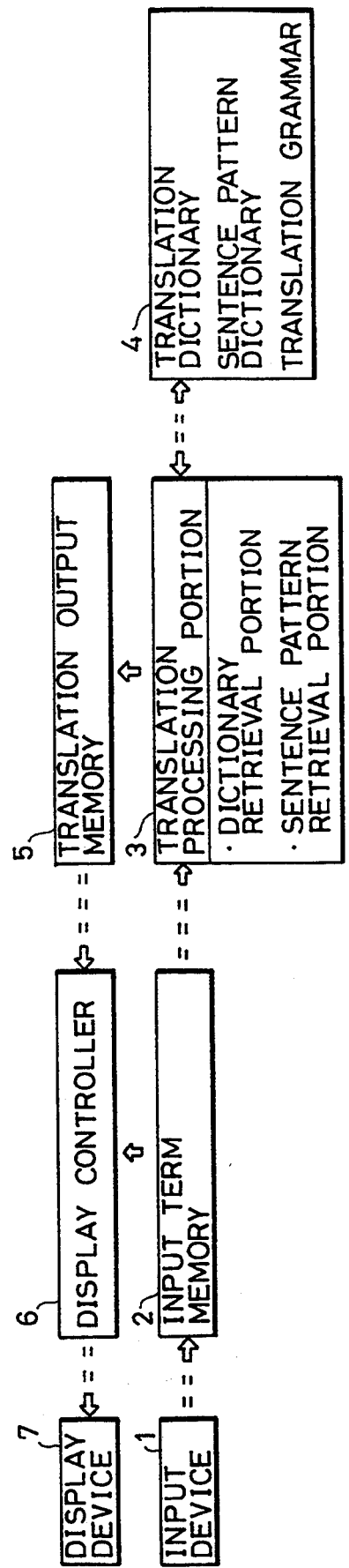

FIG.3

| borrow | [hito] ga / borrow / [mono·kane] wo / [hito·soshiki] kara |
| look for | [hito] ga / look for / [mono] wo |

LANGUAGE PROCESSING APPARATUS FOR CARRYING OUT TRANSLATION PROCESS BASED ON SENTENCE PATTERN INFORMATION

BACKGROUND OF THE INVENTION

1. Field of the Invention

The present invention relates to language processing apparatus, and more particularly to a method of translation process for realizing conversion from a first language to a second language other than the first language.

More specifically, the present invention relates to a language processing method of various information processing apparatus such as word processors, computers, and book-type electronic organizers.

2. Description of the Background Art

There are mainly two methods of converting Japanese into a foreign language such as English utilizing a computer. One method is to carry out translation with each sentence as a conversion unit using a translation software or a translation system having processing steps such as input sentence analysis, conversion, output sentence generation with respect to an arbitrary entered sentence. The other method is carried out in a dictionary manner that simply converts under word level and does not carry out analysis or generation. As a modification of the second method, there is an apparatus that obtains a translated sentence corresponding to an original sentence by preparing in advance an original sentence and a corresponding translated sentence with respect to a limited number of sentences.

Structure diagrams of such a conventional translation system and a dictionary format system are shown in FIGS. 6 and 7, respectively. These structures will be described briefly with reference to the drawings.

Referring to FIG. 6, a sentence to be translated which is entered from an input device 1 such as a keyboard is stored in an input sentence memory 2. The sentence stored in the input sentence memory 2 is displayed on a display device 7 under the control of a display controller 6, and transmitted to a translation processing portion 3 as the data to be translated. The translation processing portion 3 internally includes a morphological analysis portion, a syntactic analysis portion, a semantic analysis portion, a language conversion portion, and a sentence generation portion. With such analysis portions, the translation process is carried out with reference to the translation dictionary and translation grammar stored in a dictionary portion 4. The sentence translated by the translation processing portion 3 is stored in a translation output memory 5 to be displayed as a translated sentence on the display device 7 via the display controller 6.

Referring to FIG. 7, an input term or a selected sentence entered from the input device 1 is temporarily stored in the memory 2. The stored contents are displayed on the display device 7 under the control of the display controller 6 and transmitted to the translation processing portion 3, as in the case of FIG. 6. The translation processing portion 3 carries out the translation process with reference to the translation dictionary or the data base of example sentences in the dictionary portion 4 by a dictionary retrieval portion or an example sentence retrieval portion provided therein. The translated result is stored in the translation output memory 5 to be displayed on the display device 7 as a translated sentence via the display controller 6.

Although the translation of an arbitrary sentence is possible with a translation software in the above-described conventional translation system, a large capacity memory is required for storing the translation program, dictionary and the like with a computer of high performance for translation processing. Furthermore, reliability oil the translation was not satisfactory and only a few could be used directly as a translation sentence in such a translation system.

The system of a dictionary format can be realized even with a small computer, and the necessary memory capacity for translation programs and dictionaries is relatively small. However, there is no function to produce a translated sentence, and the user had to create a translated sentence within the range of his or her own translation ability based on the words. Also, the conversation sentence conversion feature in a modification of such a system does not incorporate the function for translation. More specifically, a translated sentence corresponding to an original sentence stored in the internal contents of pairs of an original and a translation is obtained, and a translated sentence with respect to an arbitrary sentence cannot be created. If a large number of originals are stored internally, the memory capacity is increased and the selection of an original cannot be achieved easily. Although there are an infinite number of required sentences, only conversation sentences and the like which are assumed as basic are stored.

SUMMARY OF THE INVENTION

An object of the present invention is to eliminate the need of advanced language processing technique in a language processing apparatus.

Another object of the present invention is to reduce the required memory capacity in a language processing apparatus.

A further object of the present invention is to facilitate the usability of a language processing apparatus.

In order to achieve the above objects, a language processing apparatus according to the present invention includes an input device for entering a portion of a sentence in a first language, and a display device for displaying a second language corresponding to the portion of the entered sentence and to display information in the first language term for constructing a sentence based on the portion of the entered sentence.

The language processing apparatus with the above structure includes information such as stored sentence patterns for constructing a sentence based on the entered portion of a sentence displayed in the first language, so that the memory capacity can be reduced with respect to the requirements of the above noted prior art and the usability facilitated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a system block diagram showing the structure of a translation processing apparatus according to an embodiment of the present invention.

FIG. 2 is an example of the specific contents of a translation dictionary included in the dictionary portion 4 of FIG. 1.

FIG. 3 is an example of the specific contents of a sentence pattern dictionary included in the dictionary portion 4 of FIG. 1.

DESCRIPTION OF THE PREFERRED EMBODIMENTS

Figure 4:
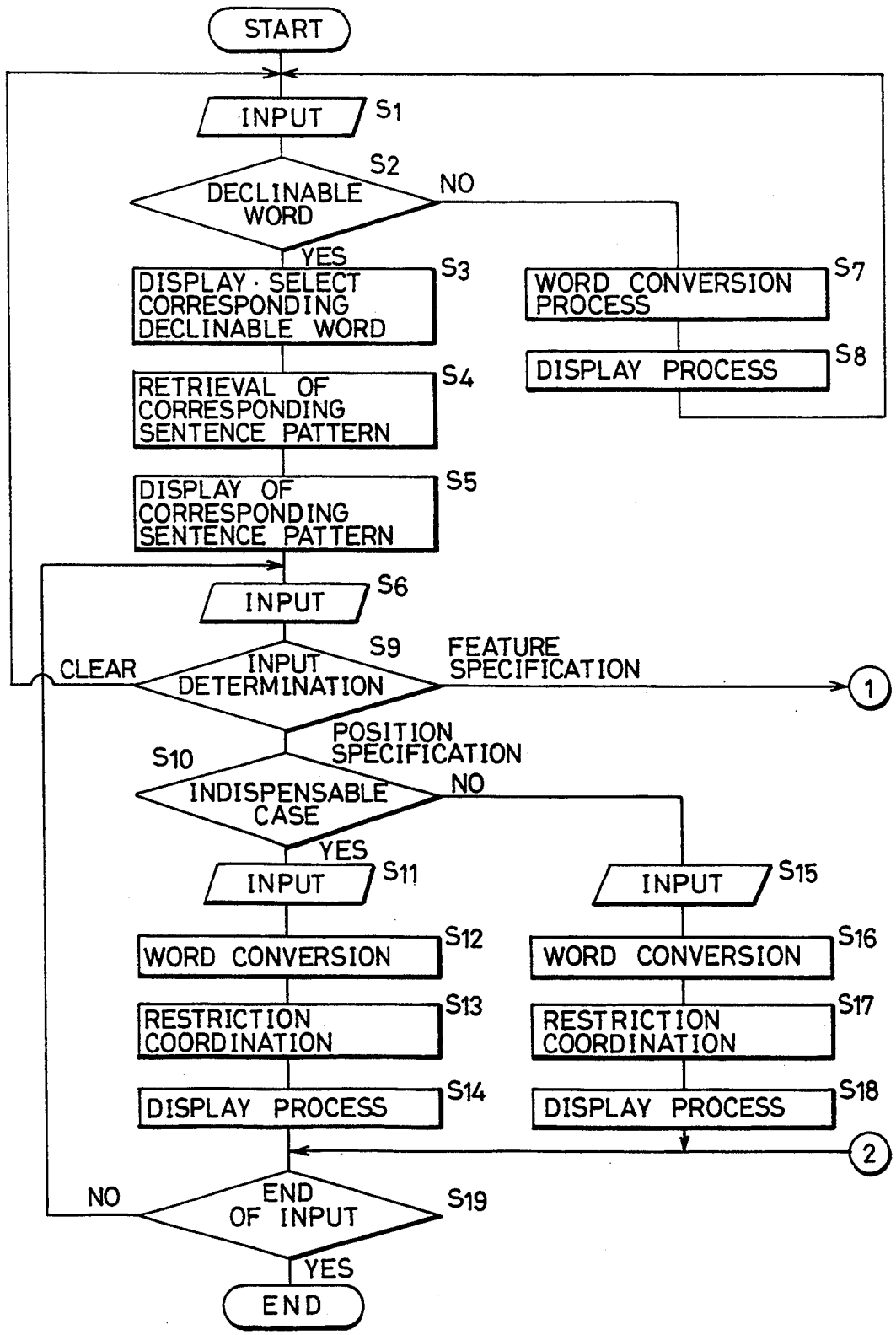
FIG. 4 shows a portion of a flow chart according to the translation process of the translation processing portion 3 of FIG. 1.

Although Japanese and English are used as the first language and the second language, respectively, in the description of the embodiment of the present invention, any language besides Japanese is applicable as the second language. It is also obvious that the present invention is applicable to a system structure in which the first language is not Japanese and the corresponding second language is a language other than the first language.

FIG. 1 shows an example of a structure of a translation processing apparatus according to an embodiment of the present invention.

Referring to FIG. 1, the translation processing apparatus includes an input device 1 such as a keyboard for entering various character information and the like, an input term memory 2 for storing a character train entered by the input device 1, and a translation processing portion 3 for producing a translated sentence with reference to the translation dictionary and translation grammar in a dictionary portion 4 with respect to the stored character train. The translation processing portion 3 includes a dictionary retrieval portion and a sentence pattern retrieval portion. The translation processing apparatus 3 further includes a translation output memory 5 for storing the translated result, a display device 7 for displaying input characters and the translated result, and a controller 6 for controlling the display device 7.

Figure 5:
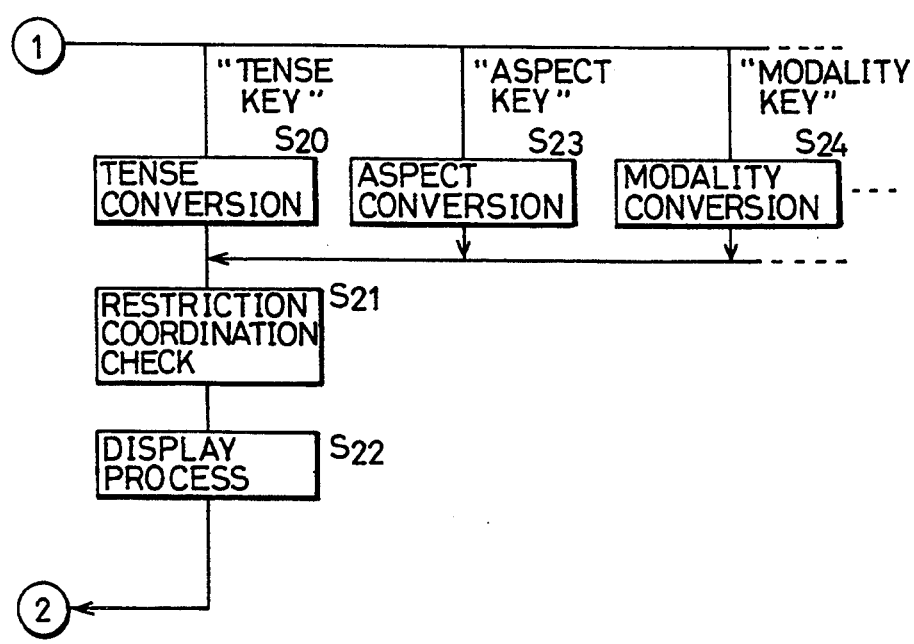
FIG. 5 shows the other portion of the flow chart according to the translation process of the translation processing portion 3 of FIG. 1.
Figure 6:
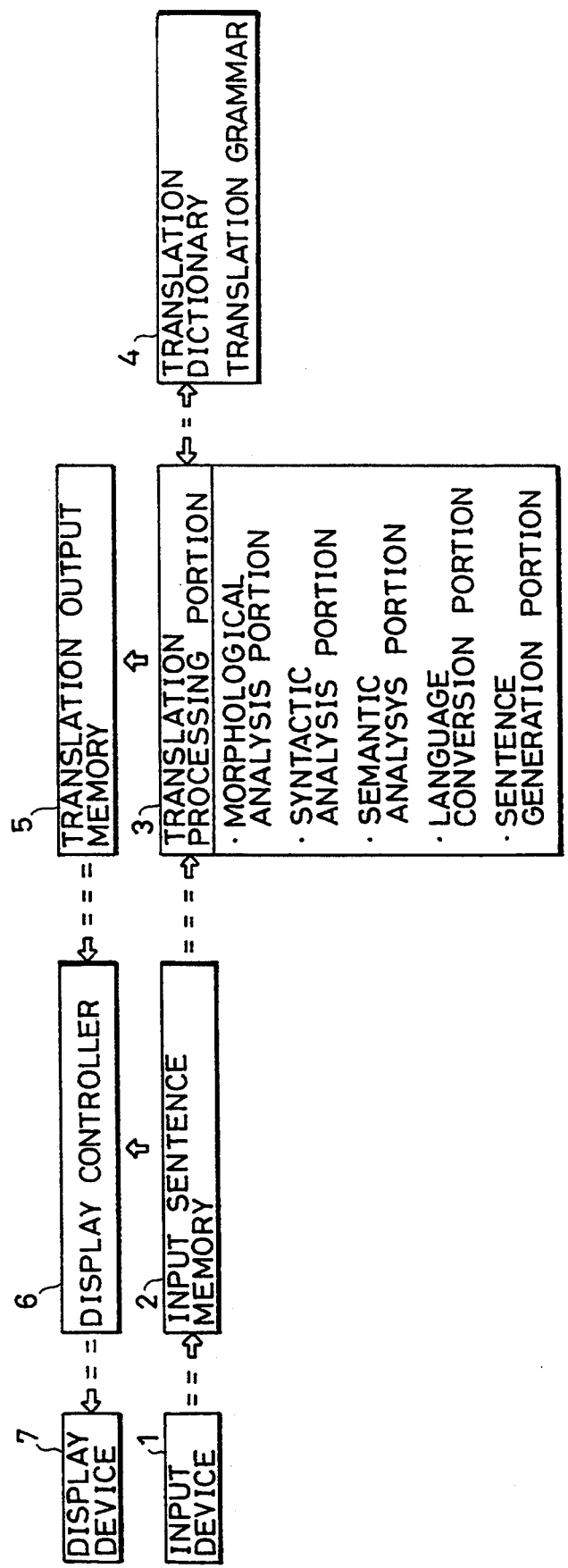
FIG. 6 is a system block diagram showing an example of a conventional translation processing apparatus.
Figure 7:
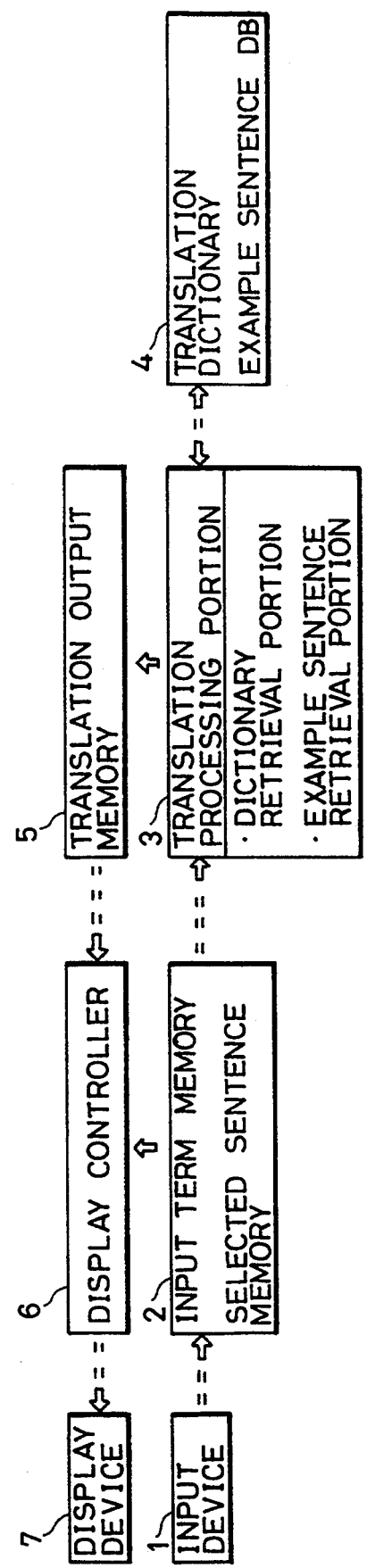
FIG. 7 is a system block diagram showing another example of a conventional translation processing apparatus.

FIG. 2 shows a portion of the contents of the translation dictionary of the dictionary portion 4 for implementing the present invention, and FIG. 3 shows an example of a structure of the sentence pattern dictionary in the dictionary portion 4. FIGS. 4 and 5 are flow charts showing the process according to the present invention.

The present embodiment will be described with reference to the process flow charts of FIGS. 4 and 5.

In step S1, Japanese is entered from the input device 1 showing in FIG. 1. The input of Japanese is arbitrary and may be carried out using a keyboard or by handwriting input using a tablet or the like. At step S2, determination is made whether the entered character train is a declinable word or a substantive. A declinable word is a general term for verbs, adjectives, and the like (the difference between these terms depends on the original language) that are subjected to inflection and can be declined, and a substantive is a general term for those that can not be declined, i.e. an independent word such as nouns, pronouns, numerals and the like that do not inflect. The determination of whether a declinable word which is treated as a declinable portion of a sentence subject to inflection or a substantive is required to branch the program to a process of carrying out translation according to a conventional level of words or a language process according to the processing method of the present invention. There are two ways of making this determination.

The first way is to make a determination under the condition that an input mode is specified to enter a declinable word or a substantive, i.e. making determination based on a set mode. The other way is to search the word dictionary according to the entered character train to make a determination from the detected part of speech. In the present invention, the determination may be carried out by either way, or by a method of a combination of these ways.

Because step S1 is the step corresponding to the first input, the program will proceed to step S7 without employing the processing method of the present invention which will be described hereinafter, if the entered character train is a substantive. At step S7, the translation dictionary of the dictionary portion 4 shown in FIG. 2 is referred to, whereby translation from Japanese to English is carried out under word level with respect to the entered characters. At step S8, the result is displayed on the display device 7 of FIG. 1, and the program returns to step S1 to receive the next input. If translation is carried out under the conventional conversion method under the word level, the entered declinable word and substantive will be subjected to the process of steps S7 and S8.

The procedure when the input character train is a declinable word is shown in step S3, which is the process according to the present invention. The translation dictionary in the dictionary portion 4 is retrieved from the input character train to derive a corresponding English expression. FIG. 2 shows a portion of the translation dictionary, where there are a plurality of English words for a Japanese word. The displayed contents on the display device 7 are shown as follows when a Japanese word of "sagasu" is entered.

"sagasu"
  1. look for
  2. search
  3. seek

Although not shown in the flow chart of FIG. 4, if a plurality of English expressions are displayed, a procedure is required to specify the number of a candidate to select a particular expression. After an expression is selected (S3), a sentence pattern corresponding to that English expression is searched in the sentence pattern dictionary in the dictionary portion 4 at step S4, whereby the retrieved sentence pattern is displayed on the display device 7 at step S5. FIG. 3 shows a portion of this sentence pattern dictionary. As shown in the figure, the sentence pattern dictionary includes information according to the case grammar. For example, the case element and its position and order of an English word "borrow" is included. This is the first feature of the present invention.

In translation to English for the expression of "look for" as an example, the sentence pattern in English is:

ti [human]/look for/[something]$_o$

, whereby a sentence pattern dictionary based on Japanese which as the native language is generated as:

[hito (corresponding to human)] "ga" look for [mono (corresponding to something)] "w$_o$"     (1)

That is to say, the pattern sentence of "look for" is in
English: [human]/look for/[something]$_o$ (2)

The sentence pattern of "sagasu" in Japanese is
[hito]ga/[mono] wo/sagasu$_o$ (3)

In the present method, the display of the above-described conversion state is not expressed as the English pattern sentence of (2), but is expressed as a mixed type of (2) and (3) such as (1). This is the second feature of the present invention. Thus, the succeeding conversion can be deliberated based on the native language of Japanese, resulting in an expression that is easily understood by one who does not have sufficient understanding of English.

At step S6, the next input is received. Determination is made what that input is in step S9. If the input is a feature specification such as the tense conversion, the program proceeds to any of steps S20, S23, S24, . . . of FIG. 5 according to the feature. If determination is made of the position specification, the program proceeds to step S10. If the specification was carried out by a clear key, the program returns to step S1, i.e. to the initial state. The program will return to step S6 after a series of steps under either of the feature specification or the position specification, so that the process can be carried out repetitively if necessary.

The process when the input is a position specification will first be described. At step S10, determination is made whether the element of the sentence pattern is an indispensable case or an arbitrary case other than an indispensable case. An indispensable case is a mandatory element of a sentence such as a nominative case, an accusative case, a dative case, and the like. An arbitrary case as an element that is selectively used if necessary such as a time case, a position case, and the like. If the position specification corresponds to an indispensable case, the translation dictionary in the dictionary portion 4 is retrieved according to the character train entered at step S11, whereby word conversion is carried out at step S12 according to the retrieved result. At step S13, a process is carried out that derives and executes the restriction to the converted word or the predicate in accordance with the sentence pattern dictionary and translation grammar of the dictionary portion 4. For example, if "kanojo" is entered in the region of "[hito ga" which is the nominative, the region of "[hito] ga" is replaced by "she". That is to say, the sentence pattern display is as below:

→She looks for [mono]$_o$

Such a construction of a sentence by conversion under word level based on a sentence pattern is the third feature of the present invention. Because "She" is the third person singular and a grammar restriction of a present tense is applied, a process of automatically converting "look" to "looks" is carried out after the conversion to "she". The process of carrying out restriction to elements other than that entered referring to the sentence pattern dictionary and the translation grammar according to the input is the fourth feature of the present invention. The result is displayed on the display device 7 at step S14, and the program returns to step S6 for the next input. If the position specification is not an indispensable case, a process is carried out in steps S15–S18 similar to that of the case of the indispensable case.

The program branches at step S10 because there may be difference in the restriction according to whether the position specification is an indispensable case or not. The contents of steps S15–S18 may be integrated into steps S11–S14 to carry out relevant process in a restriction coordination process of step S13, since the determination of the element being an indispensable case or not may be described in the sentence pattern dictionary. An example where position specification is carried out that is not an indispensable case includes the case where an adverb is entered or a modifier for relative elements is entered.

For example, in order to enter "hon (corresponding to book)" in [mono], and particularly an "akai" (corresponding to red)" book in the above-described sentence expression, the display of:

She looks for [donna (corresponding to what)] a book followed by specifying the position of [donna] to enter "akai" will result in the conversion to:

She looks for a red book.

If "nisatsu no (corresponding to two)" is entered to [donna], the expression is converted as follows to satisfy grammatical restrictions:

She looks for two books.

That is to say, not only "two" is replaced by [donna], but "a" is removed and "book" is converted to "books" to satisfy grammatical restrictions. This is the fifth feature of the present invention, and corresponds to the process of steps S15–S18.

The case where feature specification is carried out will be described hereinafter with reference to the flow chart of FIG. 5. If the instructions at step S6 is inputted by a feature key such as indicating conversion of "aspect", for example "progressive form", the program proceeds to step S23 according to the determination in step S9, whereby the feature process of "aspect" conversion is carried out. In the case of the above sentence example, the depression of a "progressive form" key will change the sentence of:

She looks for a red book.
to a sentence in a progressive form as follows:
She is looking for a red book.

This is the sixth feature of the present invention in which necessary portions are changed to comply with the feature specification according to the sentence pattern dictionary and the translation grammar regarding the tense, the aspect, the modality and the like.

At step S21, the restriction coordination is checked. At step S22, the contents are displayed, and the program returns to step S19. Although only "looks" is converted into "is looking" with no change in other elements in the above example sentence, a restriction coordination check as set forth in the following is carried out in step S21.

If a "past tense" feature specification is carried out for the sentence of:
She is looking for a book now.
the sentence of:
She was looking for a book now has an adverb "now" that does not comply with the tense. Therefore, this is indicated by means such as adding an underline as:
She was looking for a book now. Also, a message pointing out that "now" as not appropriate, or a message indicating the necessity of removing "now" or replacing it with an adverbial word implying the past is displayed to prompt an adequate process of the user. Such a process is required because the need to replace "now" or whether the specification of "past tense" is mistaken or not cannot be identified from the grammar information or the sentence pattern information.

Although the program returns to the initialization state by the specification input of "clear" under the input determination at step S9 in the flow chart, the present invention may be implemented to return to step S1 omitting a subsequent process flow by inserting a determination step at any stage where the information required by the user is presented in a display format.

The above embodiment shows a method of converting Japanese as the first language into another language other than Japanese, i.e. English, as the second language. This takes into consideration the usability of one who is fluent in Japanese as the first language. Therefore, a process may be carried out in which the first language is Chinese for one who is fluent in Chinese for conversion into a second language other than Chinese. This is the seventh feature of the present invention. In any case, the present invention can be applied to the conversion of a language by preparing the contents of the dictionary portion 4 of FIG. 1 corresponding to certain particular language.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A language processing apparatus comprising:
   input means for entering a term which is a portion of a sentence in a first language,
   first memory means for storing the term in said first language and storing a second language equivalent to said term,
   second memory means for storing declinable terms comprising verbs or adjectives in said first language and for further storing information comprising sentence patterns based on said declinable terms,
   translation processing means responsive to said input means for determining whether an entered term is a declinable term,
   display means responsive to said translation processing means for displaying character patterns, and
   said translation processing means including control means for controlling said display means whereby in response to the determination that an entered term is a declinable term, the display means displays character patterns including the entered definable term, the second language equivalent to the declinable term and a sentence pattern based on the entered declinable term for constructing a sentence in said second language based on the declinable term whereby the displayed sentence pattern includes words in both the first and second languages and information pertaining to an indispensable case.

2. A language processing apparatus as in claim 1, further comprising:
   conversion means responsive to said translation processing means, the first memory means and said input means for converting a non-declinable entered term related to a portion of said displayed sentence pattern into a further character pattern in said second language corresponding to said entered non-definable term, and
   said control means responsive to said input means and said conversion means further controlling said display means to display said character patterns including the further character pattern.

3. The language processing apparatus according to claim 2, wherein said control means determines a grammatical feature of said converted term and controls said display means to display said information using proper grammar based on said feature.

4. A language processing method in a language converting apparatus including input means for entering a term in a first language, converting means for converting said entered term into a second language equivalent term, said second language being different from said first language, storing means for storing information comprising sentence patterns based on declinable word portions of a sentence, and display means for displaying simultaneously said entered term and said converted equivalent term, said method comprising the steps of:
   determining whether said entered term is a declinable word portion of a sentence, and when said entered term is a declinable word portion of a sentence,
   displaying said entered term in the first language along with said second language equivalent term corresponding to said entered declinable word portion of a sentence, further displaying information comprising a sentence pattern in said first language for constructing a sentence in said second language based on said entered declinable word portion of a sentence so that a stored sentence pattern based on said entered declinable word portion of a sentence is displayed which includes words in both said first and said second languages and further displaying information in said second language pertaining to an indispensable case included in the displayed sentence pattern associated with the entered declinable word.

5. The language processing method according to claim 4, wherein said displayed information of the indispensable case is divided into sentence elements, whereby a term of said first language entered for each of said divided sentence elements is converted to an equivalent term in said second language corresponding to each sentence element.

6. The language processing method according to claim 5, wherein
   when a term of said first language corresponding to said divided sentence elements is entered, said displayed equivalent term in said second language is corrected to satisfy second language grammatical restrictions when there is a grammatical influence on said term by a previously entered and converted term.

7. The language processing method according to claim 5, wherein
   when a modifier is entered by said input means corresponding to a previously entered sentence element, the displayed term in said second language is corrected to satisfy grammatical restrictions on said entered modifier and the previously entered sentence element.

8. The language processing method according to claim 4, wherein
   when an instruction for conversion of the tense is specified with respect to a displayed term of said second language, conversion in said second language corresponding to said specified instruction is carried out.

* * * * *